Figure 1:
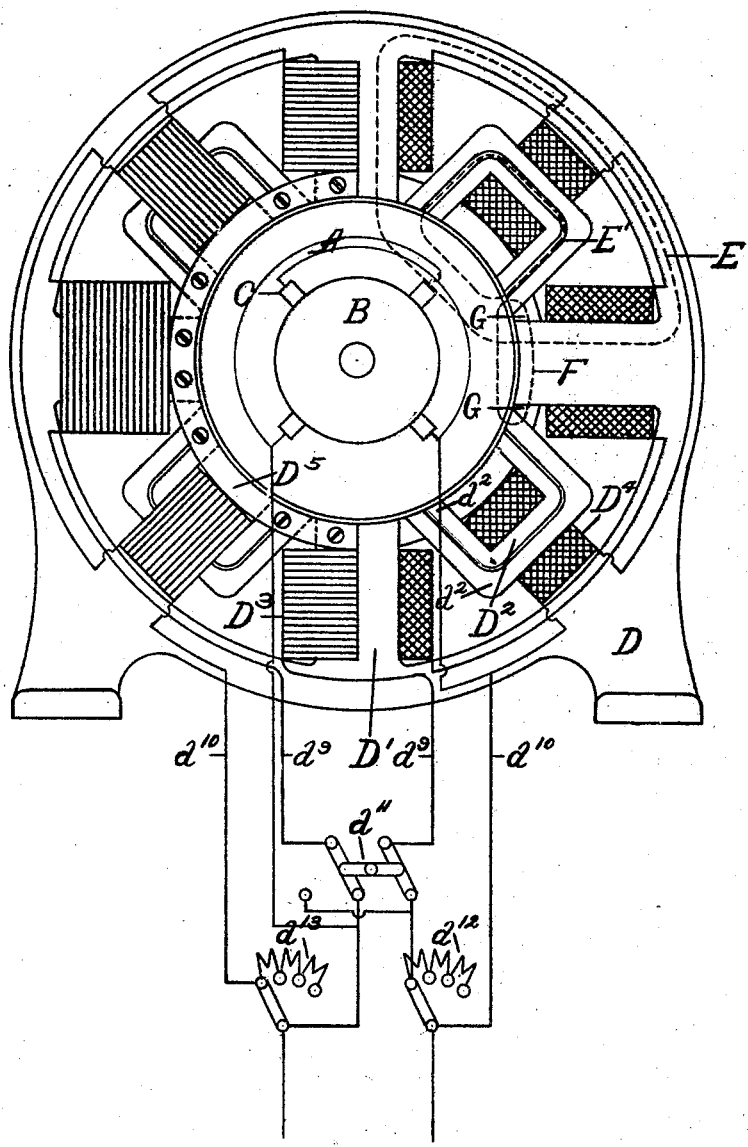

No. 794,998. PATENTED JULY 18, 1905.
F. A. MOTT.
DYNAMO ELECTRIC MACHINE.
APPLICATION FILED NOV. 27, 1903.

3 SHEETS—SHEET 1.

Witnesses
Willis E. Cadwell
M. C. Sullivan

Inventor
Frederick A. Mott
by W. C. Leaf.
Attorney

No. 794,998. PATENTED JULY 18, 1905.
F. A. MOTT.
DYNAMO ELECTRIC MACHINE.
APPLICATION FILED NOV. 27, 1903.

3 SHEETS—SHEET 2.

Witnesses
Willis E. Cadwell
M. C. Sullivan

Inventor
Frederick A Mott
by N. L. Lord
Attorney

No. 794,998. PATENTED JULY 18, 1905.
F. A. MOTT.
DYNAMO ELECTRIC MACHINE.
APPLICATION FILED NOV. 27, 1903.

3 SHEETS—SHEET 3

Witnesses
Willis E. Cadwell
M. C. Sullivan

Inventor
Frederick A. Mott
by N. C. Lind
Attorney

No. 794,998. Patented July 18, 1905.

UNITED STATES PATENT OFFICE.

FREDERICK A. MOTT, OF ERIE, PENNSYLVANIA.

DYNAMO-ELECTRIC MACHINE.

SPECIFICATION forming part of Letters Patent No. 794,998, dated July 18, 1905.

Application filed November 27, 1903. Serial No. 182,844.

*To all whom it may concern:*

Be it known that I, FREDERICK A. MOTT, a citizen of the United States, residing at Erie, in the county of Erie and State of Pennsylvania, have invented new and useful Improvements in Dynamo-Electric Machines, of which the following is a specification.

My invention relates to dynamo-electric machines; and it consists in certain improvements in the construction thereof, as will be hereinafter fully described, and pointed out in the claims.

The leading features of my invention relate to means for preventing the distortion of the magnetic field in the air-gap and pole-face of dynamo-electric machinery caused by the magnetic effect of currents in the armature-conductors and for independently varying the direction or density of the magnetic lines in different parts of the pole-face. While it is intended particularly for use on direct-current generators and motors on which voltage or speed may be varied by changing the field-flux, it can be used on both direct and alternating current generators and motors with good results.

In a direct-current generator or motor it is well known that if the brushes are on the neutral points the magnetism resulting from all of the armature ampere-turns under each pole acts with the useful flux of the field under one pole-tip and against it under the other, thus distorting the effective field along the pole-face. If the brushes are shifted from the neutral points, the armature ampere-turns embraced by double the angle of lead of the brushes act in direct opposition to the useful flux, while the balance act at an angle tending to produce distortion, as before. In practice at the present time it is usual to place reluctance in the path of the cross and the back ampere-turns of the armature by means of highly-saturated pole-tips, highly-saturated armature-teeth, and large air-gaps. All of these means increase the relutcance of the path of the useful flux as well, thus requiring increased field excitation. I am able to secure a path of high reluctance for the flux of the cross ampere-turns of the armature and at the same time secure a path of lower reluctance for the useful flux than is now usually obtainable.

Figure 2:
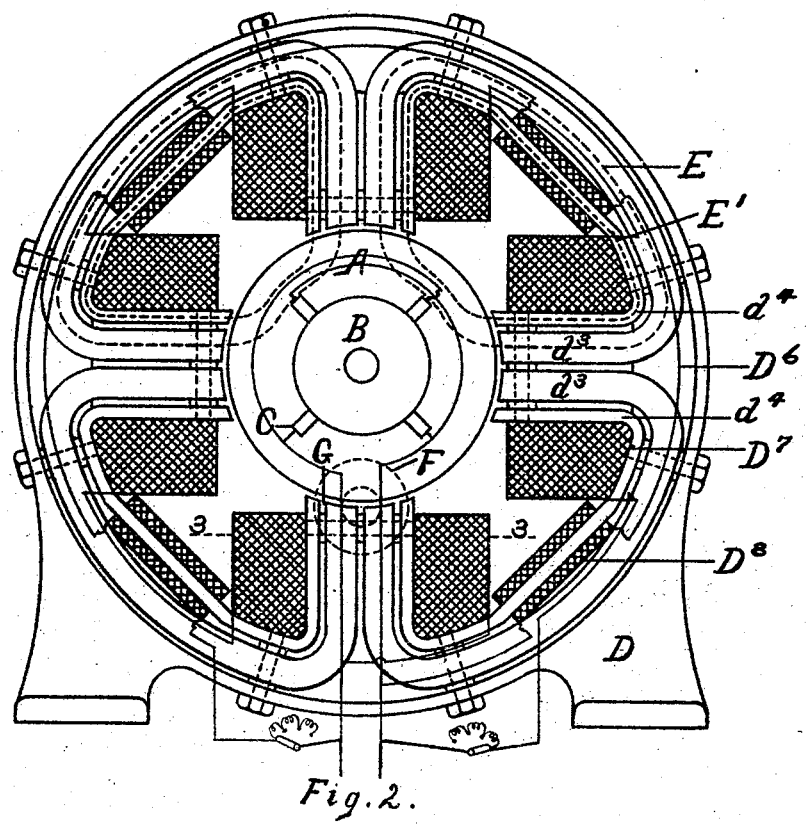
Figure 3:
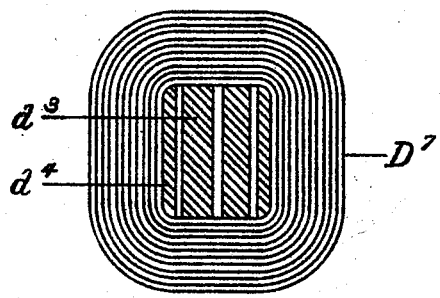
Figure 4:
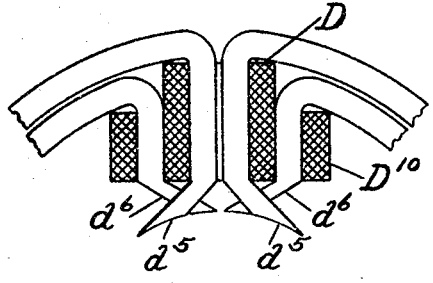
Figure 5:
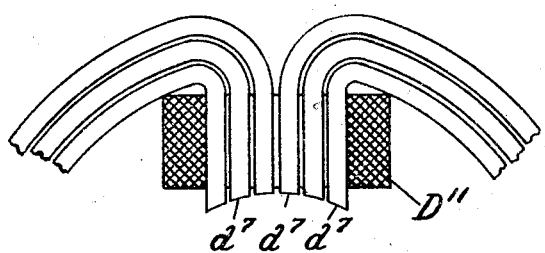
Figure 6:
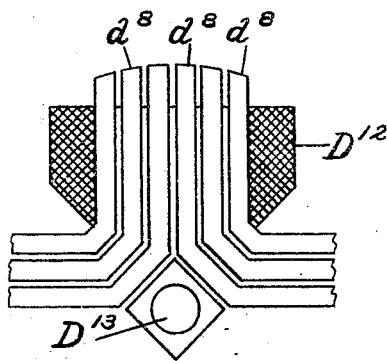

The invention is illustrated in the accompanying drawings as follows:

Figure 1 shows a side elevation of a dynamo-electric machine comprising my invention, part of the field-coils being in section to better show construction. Fig. 2 is a side elevation of an alternative construction. Fig. 3 is a section on the line 3 3 in Fig. 2. Fig. 4 shows a field-piece of an alternative construction, the windings being in section to better show construction. Fig. 5 is also a field-piece of an alternative construction, the field-windings being in section to better show construction. Fig. 6 shows an alternative construction wherein the rotating field is used, the windings being in section to better show construction.

In Fig. 1 is shown a dynamo-electrical machine with an armature A, commutator B, and brushes C of any preferred type used in connection with a special field-frame, as follows: D is an outer framework and part of the magnetic circuit. $d^2$ $d^2$ are pole-tip pieces, of steel or iron, bent or cast to form continuous and laminated parts forming magnetic circuits independent from armature air-gap to armature air-gap, as shown. These are secured to the field-frame D and to each other by means of the non-magnetic rings $D^5$ or in any substantial manner. The main pole-piece at the center is excited by the field-coils $D^3$ and the pole-tip portion by the field-coils $D^4$, the coils on the pole-tip portion being connected in proper sequence to produce poles of alternate sign surrounding the armature through the rheostat $d^3$ and the coils $D^3$ on the main pole being connected in like manner with pole-changing switch $d^{11}$ and rheostat $d^{12}$, forming an independent circuit, both of said connections, as indicated by the rheostat, providing shunt-circuits. The passage of a current through the field-coils produces a flux through the magnetic circuit of the machine, as indicated by the dotted lines E E' in the upper part of Fig. 1. The passage of a current through the armature tends to set up a flux in the direction indicated by the dotted line F. It will be noted that the air spaces or gaps G are in the paths of these fluxes produced by the cross ampere-turns of the armature, and their reluctances can be made sufficiently large to practically eliminate all of the evil effects of the cross ampere-turns. It will also be noted that these air-spaces G in no way interfere with the path of the main or effective flux produced by the current in the field-windings.

In Fig. 2, A marks the armature, B the commutator, and C the brushes. In this the field-frame $D^5$ has the pole-pieces $D^6$, which are formed of the laminations $d^3$ and $d^4$. The field-winding $D^7$ is around the entire field-piece, and consequently excites all the laminations of the pole-piece. An auxiliary winding $D^8$ is arranged on the laminæ $d^4$, so that they may be independently excited. In these devices the main pole-piece formed by the laminæ $d^3 d^3$ cannot be excited independently of the laminæ $d^4 d^4$, forming the pole-tips, as in the preferred construction shown in Fig. 1.

Fig. 4 shows another method of placing the field-coils. Here the inner coil $D^9$ excites the inner lamination $d^5$, which crosses the outer lamination $d^6$ and terminates at the pole-tips, while the outer coil $d^{10}$ excites the entire pole.

It is evident that if the coil $D^9$ alone is active the pole-tips alone will be magnetized with the proper magnetic polarity and the flux will reverse through laminæ $d^6 d^6$, so that although the pole-tips be of necessary strength to produce good commutation the electromotive force generated thereby will be opposed by a reverse electromotive force at the pole center, thereby producing a very low resultant voltage, with good commutation in case of a generator of high speed and with good commutation in case of a motor.

For special cases where it might be desirable to entirely eliminate the effect of the cross ampere-turns over the entire pole-faces a construction similar to Fig. 5 would be used. Thin sheet iron or steel pieces $d^7$ are separated by air-gaps or sheets of other non-magnetic material and bent to form the field-yoke and pole-pieces. A coil $D^{11}$ excites the entire pole.

Fig. 6 shows the same principle applied to a machine with a revolving field, of which the figure shows one pole-piece formed of laminations $d^8$. The field is mounted on the shaft $D^{13}$ and is excited by the coil $D^{12}$.

It is evident that in a direct-current generator or motor constructed on the principles above set forth the brushes may remain in practically the neutral position at all loads, as the distribution of the lines of force cannot be changed materially by the armature reaction. The brushes being in the neutral position, there will be no back ampere-turns to act in opposition to the useful flux, and the excitation can be reduced to a minimum. The armature air-gap can be reduced to that required for mechanical clearance, thus again saving energy in excitation. In a motor the useful flux through the armature can be varied by means of resistance in the field-circuit or otherwise changing the field ampere-turns from a great amount to a very small amount, with resulting increase in speed of the armature, and although the armature may be carrying full-load current there will be practically no field distortion, and good commutation can be maintained even with a weak field without shift of brushes. For greater variation of speed the center portion of the pole only would be demagnetized (see Fig. 1) and its polarity reversed by means of pole-changer $d^{11}$, so as to generate an electromotive force in the armature opposing the counter electromotive force caused by the pole-tip flux. By this method any speed can be obtained without changing the density at the pole-tips. In alternating generators and motors the forms of field-rings and poles shown and described (particularly in Figs. 5 and 6) will serve, as in direct-current machinery, to prevent distortion of the magnetism in the pole-faces by the current in the armature, thus tending to maintain the sine-wave of electromotive force and current which is desirable.

The armatures of any of the machines described may be rotated in either direction with the advantages above set forth.

Without limiting myself to the precise details of construction shown and described, which may be varied without departing from the spirit of the invention, what I do claim, and desire to secure by Letters Patent, is—

1. In a dynamo-electric machine, the combination with the armature; of a field comprising a two-part pole-piece, said parts being separated by paths of high reluctance; windings for exciting said pole-piece; and means for varying the current in the windings on one of said parts independently of the windings on the other of said parts.

2. In a dynamo-electric machine, the combination with the armature; of a field comprising a two-part pole-piece, said parts being separated by paths of high reluctance; shunt-windings for exciting said pole-piece; and means for varying the current in the windings on one of said parts independently of the windings on the other of said parts.

3. In a dynamo-electric machine the combination with the armature; of a field comprising a two-part pole-piece; shunt-windings for exciting said pole-piece; and means for varying the current in the windings on one of said parts.

4. In a dynamo-electric machine the combination of the armature; a field comprising a two-part pole-piece; means for exciting one of the parts independently of the other part; and means for reversing the flux in one of the parts.

5. In a dynamo-electric machine, the combination of the armature; a field comprising two-part pole-piece; means for exciting said parts independently; and means for reversing the flux in one of said parts.

6. In a dynamo-electric machine the combination of the armature; a field comprising two-part pole-pieces, the parts of one pole-piece being independently connected with parts of another pole-piece; and means for exciting one of said parts of a pole-piece independently of another of said parts.

7. In a dynamo-electric machine the combination of the armature; a field comprising two-part pole-pieces, the parts of one pole-piece being independently connected with parts of another pole-piece; and means for exciting said parts independently.

8. In a dynamo-electric machine the combination of the armature; a field comprising a main pole-piece connected with pole-pieces of different sign at both sides of the main pole-pieces; and separate pole-tip pieces forming part of the face with the main pole-piece and independently connected with pole-faces of a different sign; and means for exciting one of said pole-pieces independently of the other.

9. In a dynamo-electric machine the combination of the armature; a field comprising a main pole-piece connected with pole-pieces of different sign at both sides of the main pole-piece; separate pole-tip pieces forming part of the face with the main pole-piece and independently connected with pole-faces of a different sign; and means for exciting said pole-pieces independently.

10. In a dynamo-electric machine the combination of the armature; a field comprising two-part pole-pieces, the parts of one pole-piece being independently connected with parts of another pole-piece; means for exciting one of said parts of a pole-piece independently of another of said parts; and means for reversing the flux in one of said parts.

11. In a dynamo-electric machine the combination of the armature; a field comprising two-part pole-pieces, the parts of one pole-piece being independently connected with parts of another pole-piece; means for exciting said parts independently; and means for reversing the flux in one of said parts.

12. In a dynamo-electric machine the combination of the armature; a field comprising a main pole-piece connected with pole-pieces of different sign at both sides of the main pole-piece; and separate pole-tip pieces forming part of the face with the main pole-piece and independently connected with pole-faces of a different sign; means for exciting one of said pole-pieces independently of the other; and means for reversing the flux in one of said pole-pieces.

13. In a dynamo-electric machine the combination of the armature; a field comprising a main pole-piece connected with pole-pieces of different sign at both sides of the main pole-piece; separate pole-tip pieces forming part of the face with the main pole-piece and independently connected with pole-faces of a different sign; means for exciting said pole-pieces independently; and means for reversing the flux in one of said pole-pieces.

14. In a dynamo-electric machine the combination of the armature; a field comprising a main pole-piece connected with pole-pieces of different sign at both sides of the main pole-piece; separate pole-tip pieces forming part of the face with the main pole-piece and independently connected with pole-faces of a different sign; means for exciting one of said pole-pieces independently of the other; and means for reversing the flux in the main pole-piece.

15. In a dynamo-electric machine the combination of the main field-piece $D'$; the pole-tip pieces $D^2$ having the lamination $d^2$ $d^2$; windings $D^3$ for the main pole-pieces $D'$; the poles $D'$ being connected both ways with poles of different sign; and the pole-tip pieces $D^2$ forming the pole-tips of two different poles; the winding $D^4$ arranged on the pole-tip pieces $D^2$ between the poles; and means for reversing the flux in the main pole-piece $D'$.

In testimony whereof I have hereunto set my hand in the presence of two subscribing witnesses.

FREDERICK A. MOTT.

Witnesses:
WILLIS E. CADWELL,
M. C. SULLIVAN.